(12) United States Patent
Park

(10) Patent No.: US 7,442,494 B2
(45) Date of Patent: Oct. 28, 2008

(54) METHOD FOR FORMING ALIGNMENT LAYER AND METHOD FOR MANUFACTURING LIQUID CRYSTAL DISPLAY DEVICE USING THE SAME

(75) Inventor: Su Hyun Park, Anyang-shi (KR)

(73) Assignee: LG.Phillips LCD Co., Ltd., Seoul (KR)

( * ) Notice: Subject to any disclaimer, the term of this patent is extended or adjusted under 35 U.S.C. 154(b) by 447 days.

(21) Appl. No.: 11/168,531

(22) Filed: Jun. 29, 2005

(65) Prior Publication Data

US 2006/0050222 A1 Mar. 9, 2006

(30) Foreign Application Priority Data

Sep. 8, 2004 (KR) .................. 10-2004-0071686

(51) Int. Cl.
*G03F 1/1337* (2006.01)
(52) U.S. Cl. .............. 430/321; 427/162; 349/124; 349/126
(58) Field of Classification Search ............. None
See application file for complete search history.

(56) References Cited

U.S. PATENT DOCUMENTS 7,244,627 B2 * 7/2007 Lee et al. .................. 438/30

2002/0012089 A1 * 1/2002 Inoue et al. ................ 349/124

FOREIGN PATENT DOCUMENTS

| CN | 1259683 A | 7/2000 |
|---|---|---|
| CN | 1264844 A | 8/2000 |
| CN | 1280679 A | 1/2001 |
| JP | 2000-089231 A | 3/2000 |
| JP | 2000-305086 A | 11/2000 |
| JP | 2004-226475 A | 8/2004 |

OTHER PUBLICATIONS

Computer-generated translation of JP 2000-089231, with abstract (Mar. 2000).*
Computer-generated translation of JP 2004-226475, with abstract (Aug. 2004).*

* cited by examiner

*Primary Examiner*—John A. McPherson
(74) *Attorney, Agent, or Firm*—Birch, Stewart, Kolasch & Birch, LLP

(57) ABSTRACT

A method for forming an alignment layer for a liquid crystal display device, and a method for manufacturing a liquid crystal display device using the same are disclosed. The method includes preparing a substrate, coating an alignment material on the substrate, rubbing the substrate having the alignment material coated thereon, and irradiating ultraviolet (UV) rays onto the substrate having the alignment material coated thereon. The UV rays are irradiated over at least one area of the substrate having the alignment material coated thereon.

24 Claims, 17 Drawing Sheets

METHOD FOR FORMING ALIGNMENT LAYER AND METHOD FOR MANUFACTURING LIQUID CRYSTAL DISPLAY DEVICE USING THE SAME

This application claims the benefit of Korean Patent Application No. 10-2004-0071686, filed on Sep. 8, 2004, in Republic of Korea, which is hereby incorporated by reference as if fully set fourth herein.

BACKGROUND OF THE INVENTION

1. Field of the Invention

The present invention relates to a liquid crystal display device, and more particularly, to an alignment layer for initial alignment of liquid crystals in a liquid crystal display device.

2. Discussion of the Related Art

Among ultra-thin flat panel display devices with a display screen having a thickness of several □, liquid crystal display devices have been widely applied to notebook computers, monitors, space shuttles, aircrafts, and so fourth due to their advantages including low operating voltage, low power consumption, portability, and the like.

Generally, a liquid crystal display device comprises a color filter substrate having color filter layers formed thereon, a thin film transistor substrate facing the color filter substrate and having thin film transistors formed thereon, and a liquid crystal layer formed between these substrates.

In such a liquid crystal display device, alignment of the liquid crystal layer is varied by application of voltage to control transmittance of light, thereby allowing an image to be reproduced. Thus, electrodes are formed on the thin film transistor substrate and/or the color filter substrate for application of the voltage such that a pixel electrode is located on the thin film transistor substrate and a common electrode is located on the color filter substrate so as to create a vertical electric field between the two substrates, or such that the pixel electrode and the common electrode are located parallel to each other on the thin film transistor substrate so as to create a horizontal electric field.

FIG. 1A is an exploded perspective view illustrating a liquid crystal display device of the former case, and FIG. 1B is an exploded perspective view illustrating a liquid crystal display device of the latter case, both according to a related art.

In the liquid crystal display device shown in FIG. 1A, a thin film transistor substrate 10 has a gate line 12, a data line 14 crossing the gate line 12, a thin film transistor T formed on a crossing region of the gate line 12 and the data line 14, and a pixel electrode 16 connected to the thin film transistor T. A color filter substrate 20 has a light shielding layer (or black matrix) 22 formed thereon in order to prevent leakage of light, color filter layers 24 for red, green and blue light, that is, R, G and B, formed in the light shielding layer 22, and a common electrode 25 formed under the color filter substrate 20. In this manner, a vertical electric field is created between the pixel electrode 16 on the thin film transistor substrate 10 and the common electrode 25 on the color filter substrate 20, thereby allowing alignment of liquid crystals to be controlled.

In the liquid crystal display device shown in FIG. 1B, a thin film transistor substrate 10 has a gate line 12, a data line 14 crossing the gate line 12, a thin film transistor T formed on a crossing region of the gate line 12 and the data line 14, and a pixel electrode 16 connected to the thin film transistor T. Additionally, a common electrode 25 is formed parallel to the pixel electrode 16 on the thin film transistor substrate 10. A color filter substrate 20 has a light shielding layer 22 formed thereon for preventing leakage of light, color filter layers 24 for red, green, and blue light, that is, R, G, and B, formed in the light shielding layer 22, and an overcoat layer 27 formed under the color filter substrate 20 for flattening the substrate. In this manner, a horizontal electric field is created between the pixel electrode 16 and the common electrode 25 on the thin film transistor substrate 10, thereby enabling alignment of liquid crystals to be controlled.

Both substrates 10 and 20 constructed as described above are combined to form a single liquid crystal display panel, and have a liquid crystal layer formed therebetween. At this time, if the liquid crystal layer is randomly aligned between the substrates 10 and 20, it is difficult to achieve a consistent arrangement of molecules in the liquid crystal layer. Thus, although not shown in the drawings, an alignment layer for the initial alignment of liquid crystals is formed in the thin film transistor substrate 10 and/or the color filter substrate 20.

The alignment layer is generally formed by a rubbing alignment method as known.

The rubbing alignment method is a method in which, after an organic polymer such as polyimide is coated in the form of a thin film on a substrate, the organic polymer is rubbed by rotating a rubbing roll having rubbing fabrics wound thereon, thereby arranging side chains of the organic polymer in a constant direction. The liquid crystals are aligned in a direction in which the side chains of the organic polymer are arranged, and a moving direction of the rubbing roll becomes the alignment direction of the liquid crystals.

However, the rubbing alignment method has several drawbacks as described below.

First, when the arrangement of the rubbing fabrics becomes disordered, a problem of light leakage can occur. FIG. 2 is a schematic perspective view illustrating a disordered arrangement of the rubbing fabrics.

As described above, since the components such as the thin film transistor, the color filter layer and the electrode layers are formed on the substrate (see FIGS. 1A and 1B), some portion 32a of the rubbing fabrics 32 wound around the rubbing roll 30 can become disordered when the rubbing roll 30 rotates on the components formed on the substrate 10 or 20 as shown in FIG. 2. As such, when the arrangement of the rubbing fabrics becomes disordered, the side chains of the organic polymer in a region rubbed by the disordered rubbing fabrics cannot be aligned, resulting in light leakage in that region due to non-uniform alignment of the liquid crystals.

Second, when the rubbing fabrics do not contact the substrate, the problem of light leakage can occur. FIG. 3 is a schematic perspective view illustrating an alignment state of the liquid crystals when the rubbing fabrics do not contact the substrate.

As described above, the electrode layers such as the pixel electrode and common electrode are formed on the substrate (see FIGS. 1A and 1B). Thus, as shown in FIG. 3, a region A where the rubbing fabrics 32 do not contact the substrate due to a step on the substrate 10 is formed. In this case, the alignment of the liquid crystals is not uniform in the region A, thereby creating the problem of light leakage.

In particular, in the liquid crystal display device shown in FIG. 1A, since the pixel electrode and the common electrode are formed in pixel regions on different substrates, respectively, there may not be so many regions having the steps formed thereon. However, in the liquid crystal display device shown in FIG. 1B, since the pixel electrode and the common electrode are repetitiously formed in parallel to each other in pixel regions on the substrate, there are many regions having the step formed thereon, whereby the problem of light leakage becomes serious.

As such, the problems in the rubbing alignment method according to the related art are caused by the mechanism for providing physical contact between the rubbing roll and the substrate.

Recently, in order to solve these problems of the rubbing alignment method, various studies have been conducted for providing a method for manufacturing an alignment layer which does not require physical contact. In particular, instead of using the rubbing alignment method, use of a photo-alignment method has been suggested, in which an alignment layer is produced by irradiating polarized ultraviolet rays onto a polymeric film. In order to align the liquid crystals, the alignment layer must have an anisotropic structure, which can be formed when the polymeric film is anisotropically reacted with the polarized UV ray.

However, although the photo-alignment method may address the above-described problems related to the rubbing alignment method described above, the photo-alignment method has a serious problem in that anchoring energy is low. More specifically, with the rubbing alignment method, since the side chains of the organic polymer are arranged in the constant direction as described above and grooves are uniformly formed over the surface of the substrate by rubbing, the alignment of the liquid crystals is controlled by mechanical interaction between the grooves and the liquid crystals as well as by chemical interaction between the side chains and the liquid crystals. On the contrary, with the photo-alignment method, the alignment of the liquid crystals is controlled by the chemical interaction between the side chains and the liquid crystals caused only by the photo reaction without forming the grooves on the surface of the substrate. Accordingly, in comparison to the rubbing alignment method, the photo-alignment method provides the lower anchoring energy and causes a problem of image sticking.

Since the problem of image sticking by the photo-alignment method is serious to such an extent that the method cannot be applied to large-scale production lines, the rubbing alignment method has been used for a large production line in spite of the problems with the light leakage.

As liquid crystal display devices of a higher quality have been increasingly required, there is a need for developing a method of aligning the liquid crystals, which can overcome or minimize the problems of the rubbing alignment method and the photo-alignment method according to the related art.

SUMMARY OF THE INVENTION

Accordingly, the present invention is directed to a method for forming an alignment layer, and a method for manufacturing a liquid crystal display device using the same that substantially obviate one or more problems due to limitations and disadvantages of the related art.

Additional advantages, objects, and features of the invention will be set fourth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for forming an alignment layer for a liquid crystal display device is provided, comprising the steps of: preparing a substrate; coating an alignment material on the substrate; rubbing the substrate having the alignment material coated thereon; and irradiating polarized ultraviolet rays onto the substrate having the alignment material coated thereon.

In another aspect of the present invention, a method for manufacturing a liquid crystal display device is provided, comprising the steps of: preparing first and second substrates; coating an alignment material on at least one of the substrates; rubbing the substrate having the alignment material coated thereon; irradiating polarized ultraviolet rays onto the substrate having the alignment material coated thereon; and combining both substrates.

According to an other aspect of the present invention, there is provided a method for forming an alignment layer for a liquid crystal display device, the method comprising: preparing a substrate, coating an alignment material on the substrate, rubbing the substrate having the alignment material coated thereon, and irradiating ultraviolet (UV) rays onto the substrate having the alignment material coated thereon, wherein the UV rays are irradiated over at least one area of the substrate having the alignment material coated thereon.

According to another aspect of the present invention, there is provided a method for manufacturing a liquid crystal display device, the method comprising: preparing first and second substrates, coating an alignment material on at least one of the substrates, rubbing the substrate having the alignment material coated thereon, irradiating ultraviolet rays onto the substrate having the alignment material coated thereon, and combining both substrates, wherein the ultraviolet rays are irradiated over at least one area of the substrate having the alignment material coated thereon.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

The present invention addresses the problems of the conventional methods by combining the rubbing alignment method and the photo-alignment method of the related art in a unique and advantageous manner. As described above, with the rubbing alignment method, when arrangement of rubbing fabrics becomes disordered or the rubbing fabrics do not contact the substrate, the alignment material coated on such a region is not aligned in the constant alignment direction. Thus, the inventors of the present application recognized this problem and conceived a method for causing the portion(s) of the alignment material not aligned by the rubbing alignment method of the related art to be aligned by a photo-alignment method uniquely configured to address this need. As a result, the alignment direction of the alignment material by rubbing becomes identical to the alignment direction of the alignment material by UV irradiation.

Figure 1A:
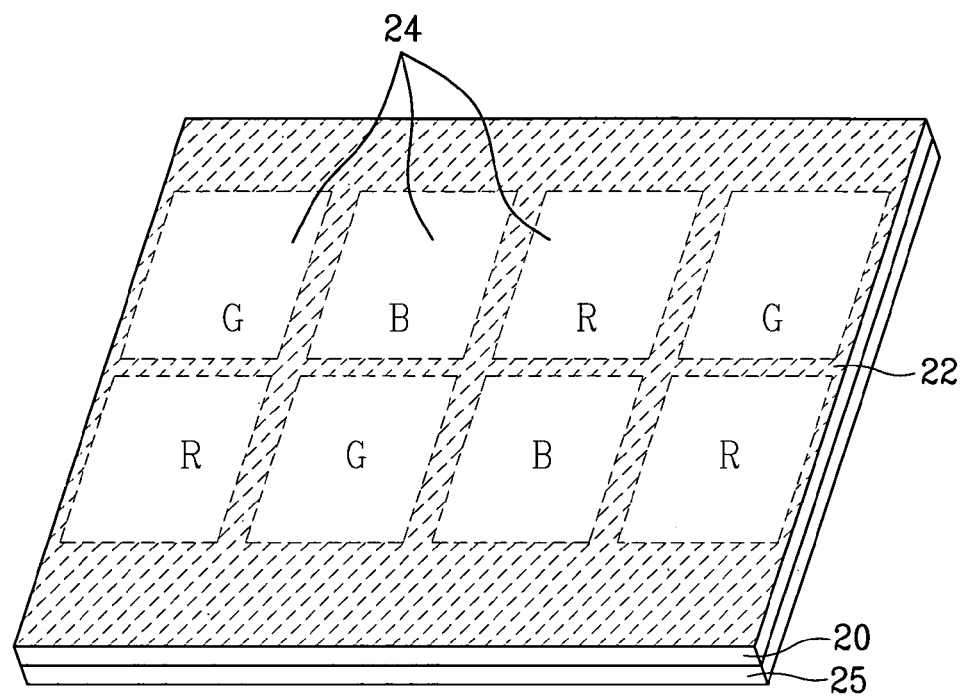
FIGS. 1A and 1B are exploded perspective views illustrating a liquid crystal display device according to a related art.
Figure 1A:
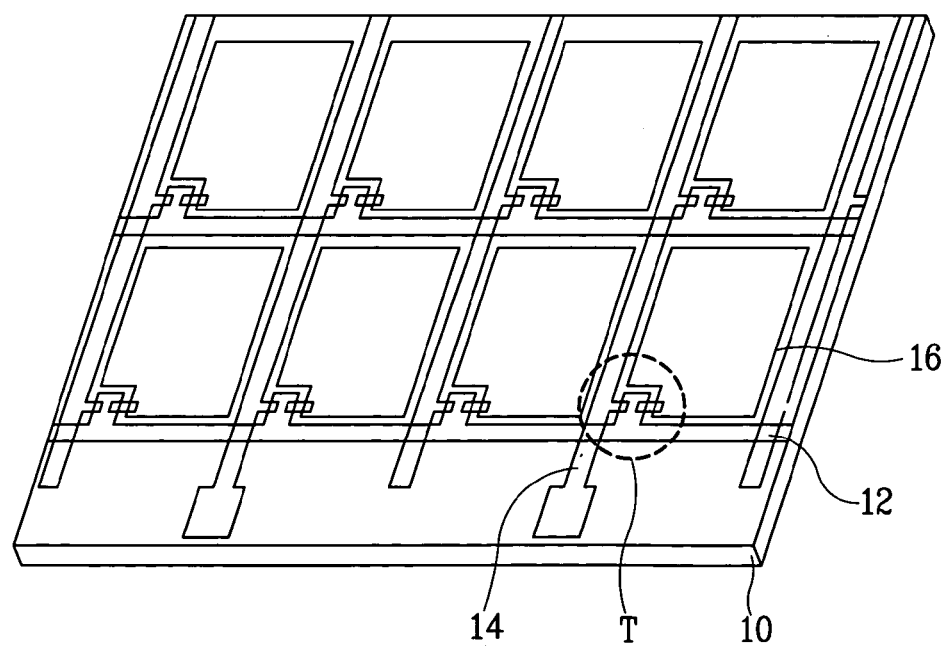
Figure 1B:
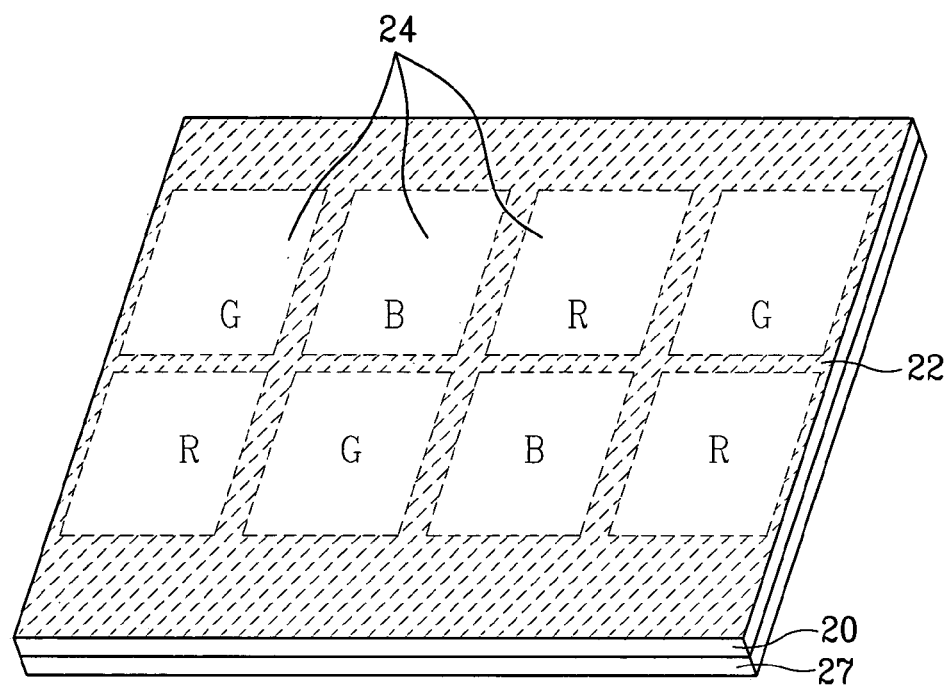
Figure 1B:
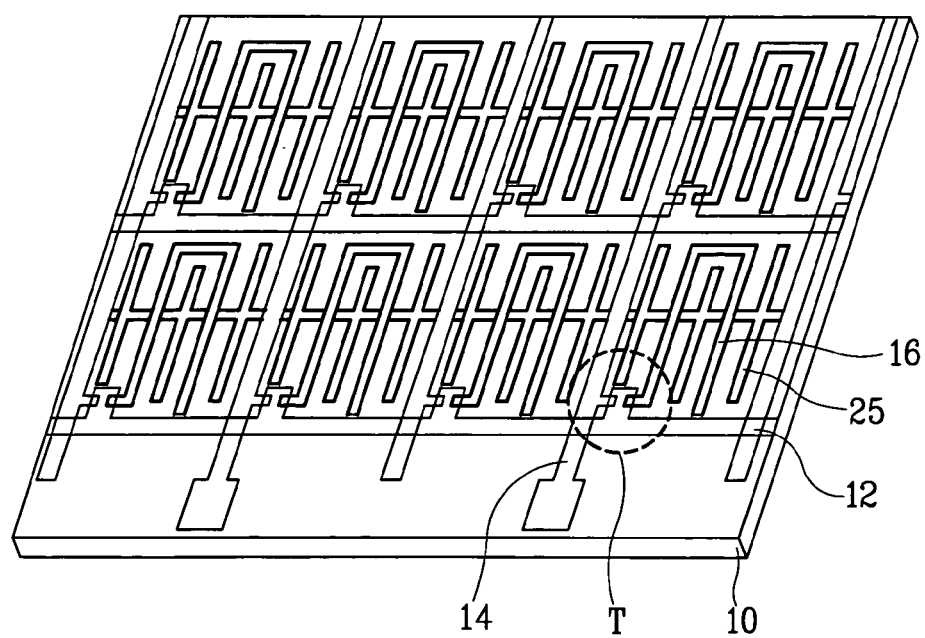
Figure 2:
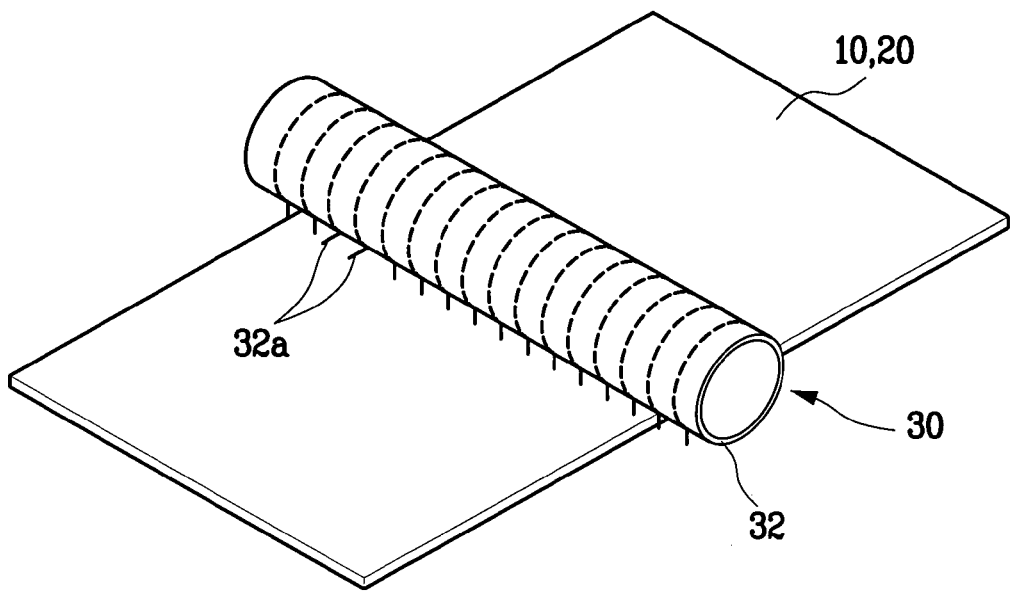
FIGS. 2 and 3 are views for illustrating problems of a rubbing alignment method according to a related art.
Figure 3:
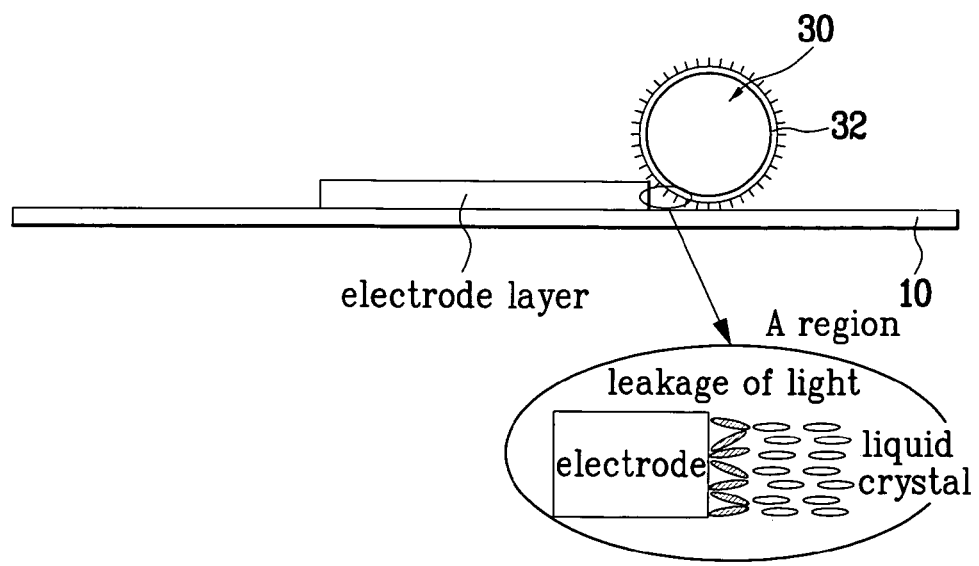
Figure 4A:
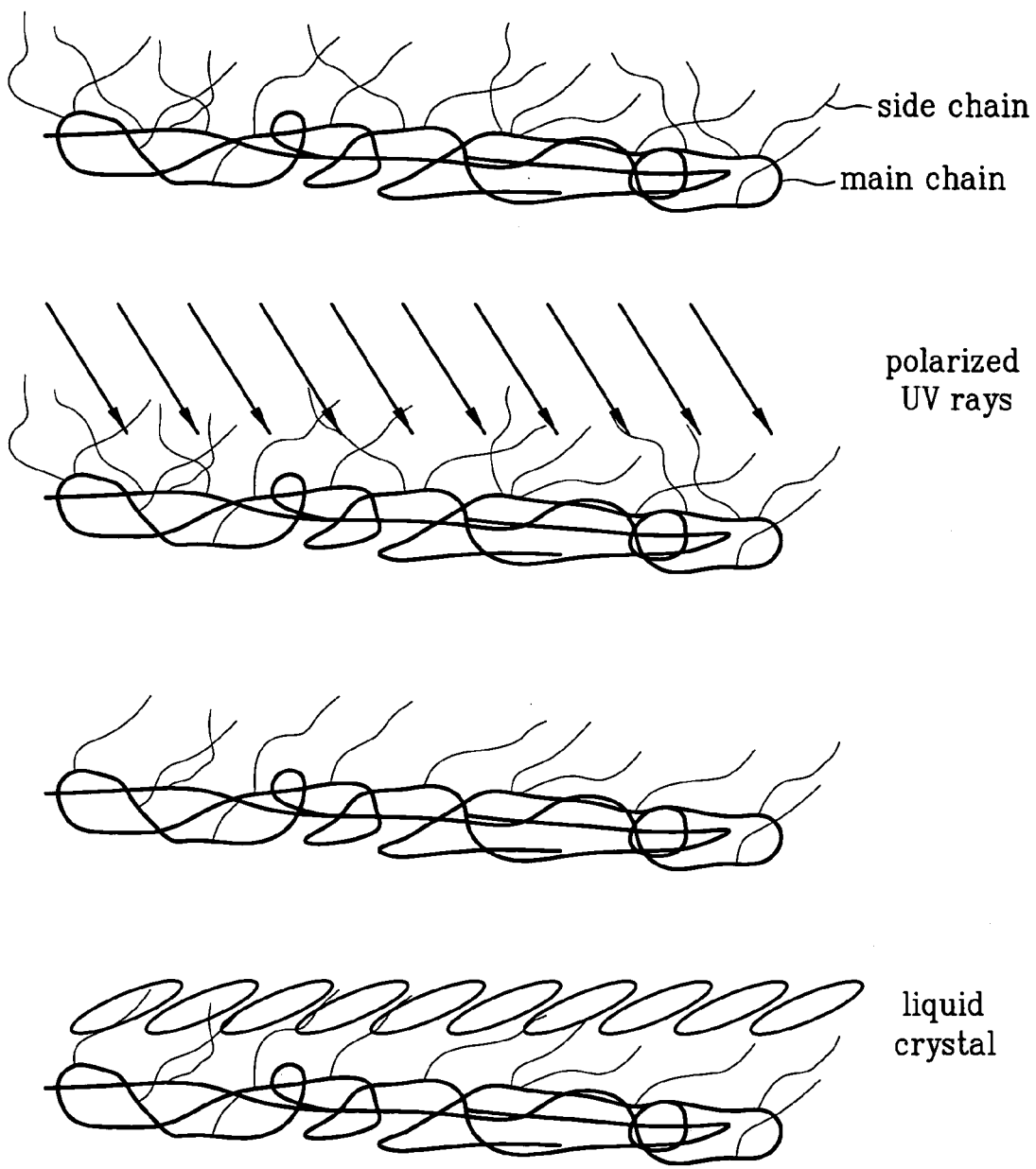
FIGS. 4A to 4C are views for illustrating a photo alignment method applied to the present invention.

The photo-alignment method can be realized by a photo-decomposition reaction, a photo-isomerization reaction, a photo-dimerization reaction, and the like depending on a kind of reaction between the used alignment material and the UV rays. The alignment material which is not aligned by the rubbing alignment method can be aligned through the respective reactions. In the photo-decomposition reaction, as shown in FIG. 4A, when the polarized UV rays are irradiated to the polymer alignment material, a connection between side chains located in a polarized direction is decomposed, and thus only the side chains vertical to the polarized direction remain, thereby allowing the liquid crystals to be aligned in that direction. Accordingly, when the alignment material not aligned by the rubbing alignment method is a material that undergoes photo-decomposition upon exposure to UV radiation, a uniform liquid crystal alignment layer can be formed by irradiating the UV rays in the polarized direction vertical to the liquid crystal alignment direction according to an embodiment of the present invention.

Figure 4B:
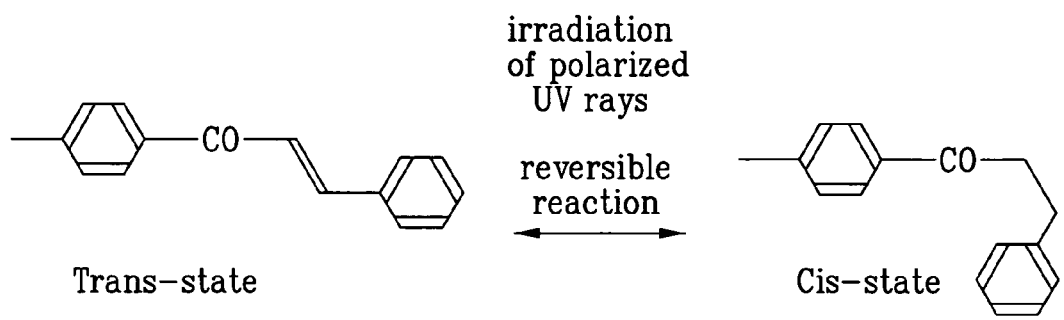

In the photo-isomerization reaction, as shown in FIG. 4B, when the polarized UV rays are irradiated to the polymer alignment material, a cis-state polymeric material can be converted to a trans-state polymeric material, and vice versa. In the case of the cis-state polymeric material, the side chains are aligned parallel to the substrate, so that the liquid crystals are aligned parallel to the substrate, and in the case of the trans-state polymeric material, the side chains are aligned vertical to the substrate, so that the liquid crystals are aligned vertical to the substrate. Accordingly, when the alignment material not aligned by the rubbing alignment method is a material that undergoes photo-isomerization under exposure to UV radiation, a uniform liquid crystal alignment layer can be formed by irradiating the UV rays in the polarized direction parallel to the liquid crystal alignment direction according to an embodiment of the present invention.

Figure 4C:
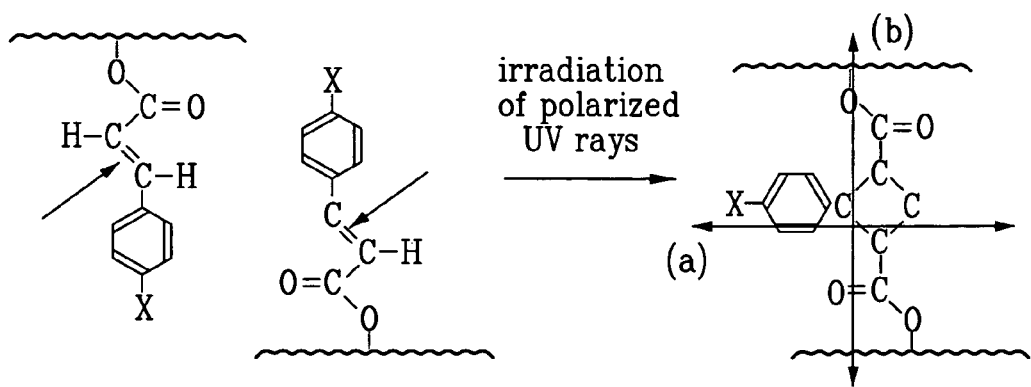

In the photo-dimerization reaction, as shown in FIG. 4C, when the polarized UV rays are irradiated, double bonds parallel to the polarization direction are broken and bonded to adjacent molecules, while single bonded side chains are arranged parallel to main chains. Here, when a length in the transverse direction is greater than a length in the longitudinal direction, the liquid crystals are arranged in the transverse direction (that is, vertical to the polarization direction), and in the reverse case, the liquid crystals are arranged in the longitudinal direction (that is, the polarization direction). Accordingly, when the alignment material not aligned by the rubbing alignment method is a material that undergoes photo-dimerization upon exposure to UV radiation, a uniform liquid crystal alignment layer can be formed by irradiating the UV rays in the polarized direction parallel to the liquid crystal alignment direction according to an embodiment of the present invention.

As such, according to the present invention, the alignment material not aligned by the rubbing alignment method is aligned in the constant direction over the entire surface of the substrate by irradiating the UV rays suitably polarized depending on the properties of the alignment material.

Here, the step of rubbing and the step of irradiating the UV rays may be performed or started at the same time or substantially the same time, the step of rubbing may be performed prior to the step of irradiating the UV rays, or the step of irradiating the UV rays may be performed prior to the step of rubbing.

The step of irradiating the UV rays may be performed over the entire surface of the substrate having the alignment material coated thereon, or may be performed at a region where a step is formed on the substrate having the alignment material coated thereon. That is, when the rubbing fabrics do not contact the substrate, the step is formed on the substrate, and thus the polarized UV rays may be irradiated to the region where the step is formed (in other words, the polarized UV rays may be irradiated to the step region while shielding regions other than the step region with a mask). When the alignment of the rubbing fabrics becomes disordered and the step is formed on the substrate, the polarized UV rays are preferably irradiated over the entire surface of the substrate. When the polarized UV rays are irradiated only on the step regions, different step regions are formed depending on whether the substrate is the thin film transistor substrate or the color filter substrate, and even when the substrates are the same, the different step regions are formed depending on whether the liquid crystal display device is a TN mode or an IPS mode.

The thin film transistor substrate of the TN mode liquid crystal display device may comprise a gate line and a data line crossing each other on a transparent substrate to define a pixel region thereon; a thin film transistor formed on a crossing region of the gate line and the data line, the thin film transistor including a gate electrode, a source electrode and a drain electrode; and a pixel electrode connected to the drain electrode of the thin film transistor. In the thin film transistor substrate of the TN mode liquid crystal display device, steps may be formed in a region where the gate line and the data line are formed, and in a region where the thin film transistor is formed. Accordingly, the polarized UV rays are preferably irradiated to the step regions while shielding regions other than the step regions with the mask.

The thin film transistor substrate of the IPS mode liquid crystal display device may comprise a gate line and a data line crossing each other on a transparent substrate to define a pixel region thereon; a thin film transistor formed on a crossing region of the gate line and the data line, the thin film transistor including a gate electrode, a source electrode and a drain electrode; a pixel electrode connected to the drain electrode of the thin film transistor; and a common electrode formed parallel to the pixel electrode. In such an IPS mode thin film transistor substrate, steps may be formed in a region where the gate line and the data line are formed, in a region where the thin film transistor is formed, and in a region where the pixel electrode and the common electrode are formed. Accordingly, the polarized UV rays are preferably irradiated to the regions having the steps formed thereon while shielding other regions with the mask.

A color filter substrate of the TN mode liquid crystal display device may comprise a light shielding layer on a transparent substrate for preventing leakage of light; color filter layers for green, red and blue light formed on the light shielding layer, and a common electrode formed on the color filter layers. A color filter substrate of the IPS mode may comprise an overcoat layer for flattening the substrate at a position of the common electrode of the TN mode color filter substrate instead of the common electrode. As such, the color filter does not have the steps formed on the substrate. Instead, column-shaped spacers may be formed on the color filter substrate in order to maintain cell gaps in the liquid crystal display device, and in this case, the steps may be formed on a region having the column-shaped spacers formed thereon. Accordingly, the polarized UV rays are irradiated to the regions having the column-shaped spacers formed thereon while shielding regions other than the regions of the column-shaped spacers with the mask.

The UV rays are the polarized UV rays (that is, 0<polarization≦1), and the polarized UV rays are partially polarized or linearly polarized.

Irradiation energy of the polarized UV rays is changed depending on the irradiation wavelength. When the irradiation wavelength is 200 nm or more and less than 300 nm, the irradiation energy is preferably between 0.05 J and 2 J. When the irradiation wavelength is 300 nm or more and 400 nm or less, the irradiation energy is preferably between 0.2 J and 9 J. When the irradiation energy is above the maximum value, the alignment material can be damaged, causing image sticking, and when the irradiation energy is below the minimum value, desired effects cannot be achieved.

The polarized UV rays may be irradiated by a vertical irradiation (that is, an irradiation angle of 90°) or by an oblique irradiation. In the case of the oblique irradiation, an angle is preferably 90° or less, considering an area of an irradiation apparatus. The step of irradiating the polarized UV ray may be performed by a scan type light exposure method or by an entire light exposure method.

Embodiment 1

FIGS. 5A to 5D are diagrams for explaining a process of forming an alignment layer for a liquid crystal display device in accordance with a first embodiment of the invention, in which the alignment layer is formed on a thin film transistor substrate of a TN mode liquid crystal display device.

Figure 5A:
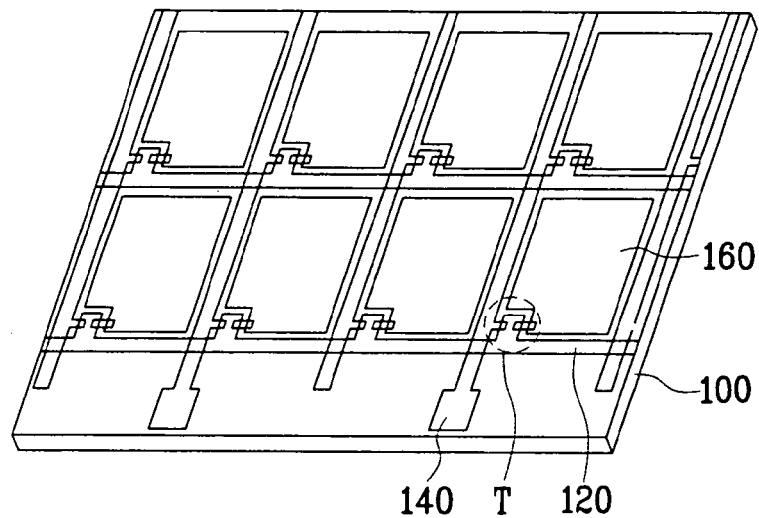
FIGS. 5A to 5D are diagrams for illustrating the steps for forming an alignment layer for a liquid crystal display device in accordance with a first embodiment of the present invention.

First, as shown in FIG. 5A, a substrate is prepared, which has a plurality of layers formed on a transparent substrate 100.

A plurality of gate lines 120 and a plurality of data lines 140 are formed on the transparent substrate such that the gate lines 120 and the data lines 140 cross each other to define plurality of pixel regions.

In each pixel region, a thin film transistor T is formed as a switching device at a crossing region of the gate line 120 and the data line 140. The thin film transistor T comprises a gate electrode, a semiconductor layer, a source electrode, and a drain electrode. A pixel electrode 160 is formed on the transparent substrate so as to be connected to the drain electrode of the thin film transistor T.

Although the layers formed on the substrate are not described in detail herein, these layers in FIG. 5A can be formed by various methods using various materials and are known in the art. Other structures may be provided on the substrate 100.

Figure 5B:
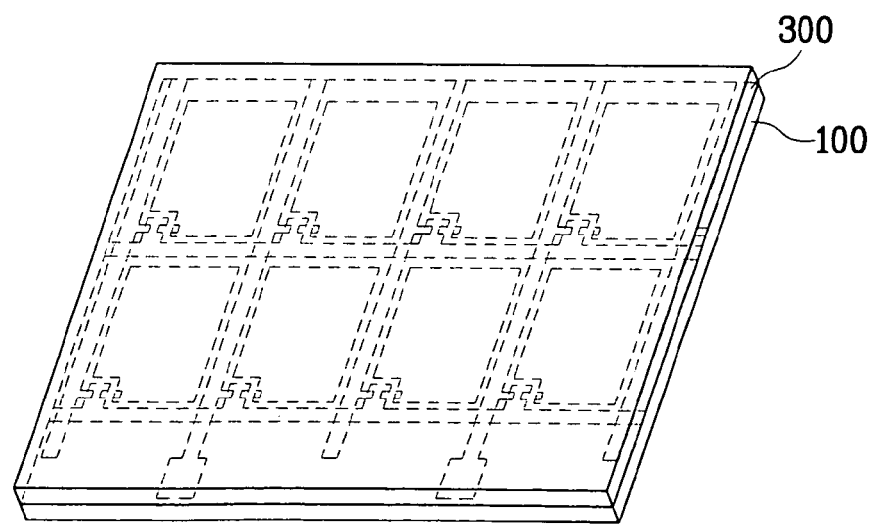

Then, as shown in FIG. 5B, an alignment material 300 is coated on the substrate. Coating is completed by curing the alignment material at two progressively higher temperatures, preferably at a temperature of 60~80 □ and then at a temperature of 80~200 □ after printing the alignment material on the substrate.

The alignment material 300 comprises any material, which allows an alignment direction thereof to be aligned by rubbing or by UV radiation as described below, and preferably comprises a polymeric material selected from polyimide, polyamic acid, polyvinylcinnamate, polyazobenzene, polyethyleneimine, polyvinyl alcohol, polyamide, polyethylene, polystyrene, polyphenylenephthalamide, polyester, polyurethane, and polymethyl methacrylate.

Figure 5C:
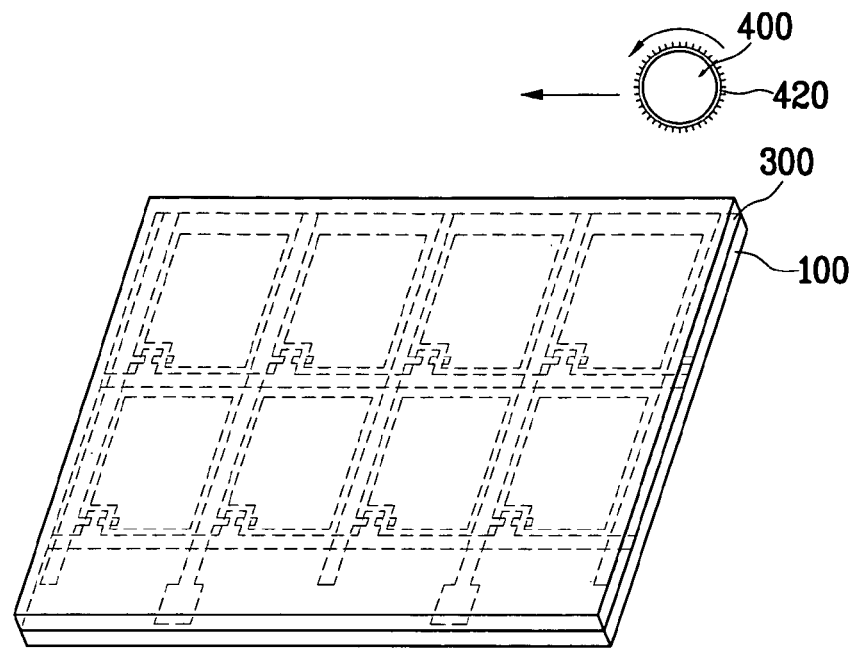

Then, as shown in FIG. 5C, rubbing is performed on the surface having the alignment material 300 coated thereon. Rubbing is performed in a desired alignment direction using a rubbing roll 400 having rubbing fabric(s) 420 attached thereto.

Figure 5D:
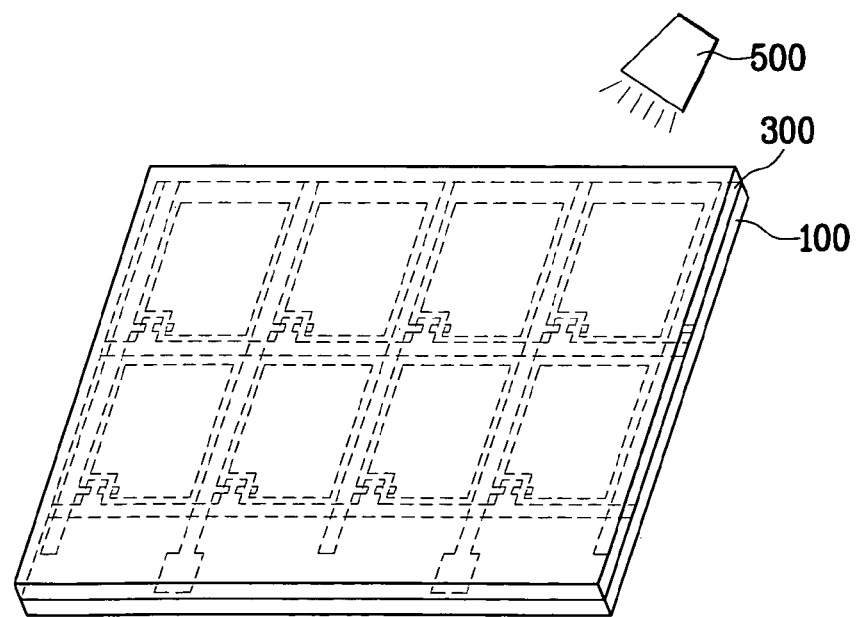

Then, as shown in FIG. 5D, polarized UV rays are irradiated onto the substrate that has completed the rubbing process using a UV irradiation apparatus 500.

As such, a UV irradiation process may be performed after the rubbing process of FIG. 5C. However, it should be noted that the present invention is not limited to this sequence. Thus, the rubbing process may be performed after the UV irradiation process, or the rubbing process and the UV irradiation process may be performed at the same time.

The UV rays may be irradiated over the entire surface of the substrate, or only on step regions where steps are formed on the substrate.

In the thin film transistor substrate of the TN mode according to the first embodiment, the step regions generally include a gate line region, a data line region, and a thin film transistor region. Accordingly, the UV irradiation process is performed on the step regions while shielding regions other than the gate line regions, the data line regions, and the thin film transistor regions with one or more masks.

Here, the gate line region, the data line region, and the thin film transistor region refer not only to regions where these components are formed, but also to surrounding regions, an extent of which is defined by a height of the steps caused by the formation of these components, a size of the rubbing fabrics, and the like. For example, the gate line region refers not only to a region where the gate line is formed, but also to a surrounding region of the gate line. Substantially, the region where the alignment is not uniformly formed by the rubbing process is the surrounding region of the gate line. That is, the step of the gate line forms a region where the surrounding region of the gate line does not to contact the rubbing fabrics. At this time, the extent of the surrounding region of the gate line will be changed depending on the height of the step of the gate line and the size of the rubbing fabrics. Accordingly, the term "step region" as used herein comprises the surrounding region as well as the region where the step is formed. The extent of the surrounding region can be changed depending on the height of the step and the size of the rubbing fabrics, and can be easily determined by those skilled in the art. Meanwhile, if additional steps are formed at other regions including the gate line region, the data line region, and the thin film transistor region, the UV rays must also be irradiated to these regions.

A polarization direction of the irradiated UV rays must be selected by considering the reaction which the alignment material coated on the substrate undergoes among the photo-decomposition reaction, the photo-isomerization reaction and the photo-dimerization reaction, and by considering the alignment direction of the liquid crystals. For example, if the alignment material is a material that undergoes the photo-decomposition reaction, the polarized UV rays must be irradiated perpendicular to a rubbing direction under consideration of the rubbing direction which is the alignment direction of the liquid crystals.

An irradiation wavelength of the polarized UV rays is preferably between 200 nm and 400 nm.

When the irradiation wavelength is 200 nm or more and less than 300 nm, irradiation energy is preferably between 0.05 J and 2 J, and when the irradiation wavelength is 300 nm or more and 400 nm or less, the irradiation energy is preferably between 0.2 J and 9 J.

As for the polarized UV rays, partially polarized UV rays or linearly polarized UV rays may be used. Additionally, the polarized UV rays may be irradiated obliquely or vertically to the substrate. In the case of the oblique irradiation, an irradiation angle is preferably 90° or less. Irradiation of the polarized UV rays may be performed by a scan type light exposure method or by an entire light exposure method.

The polarized UV rays are irradiated by the UV irradiation apparatus as described below. It should be noted that the irradiation apparatus is provided as one example and does not limit the present invention.

Figure 6:
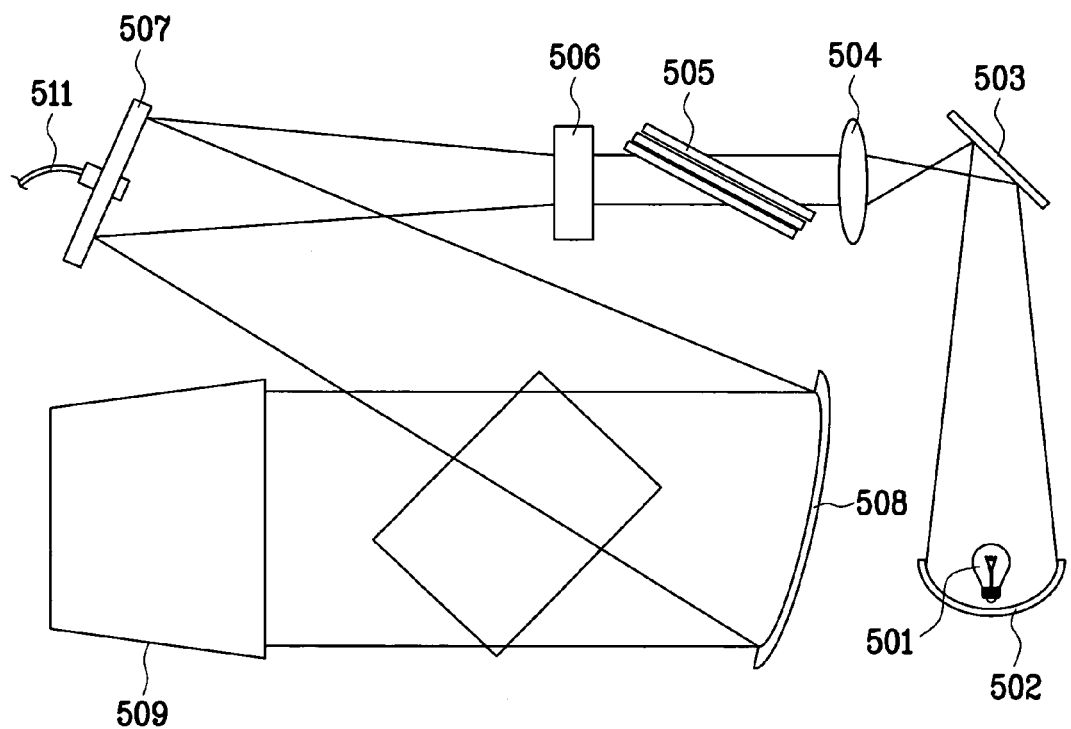
FIG. 6 illustrates one example of an irradiating apparatus in accordance with the present invention.

As shown in FIG. 6, the UV irradiation apparatus 500 comprises a lamp 501 for irradiating UV rays in one direction, a lamp housing 502, a first planar mirror 503 for reflecting the UV rays emitted from the lamp 501, a convex lens 504 for condensing the UV ray reflected by the first planar mirror 503, a polarizing system 505 for polarizing the condensed UV rays into partially polarized light or linearly polarized light, a fly eye lens 506 for multiplying a focus of the polarized UV rays, a second planar mirror 507 for reflecting the UV rays emitted from the fly eye lens 506, a UV illuminance meter 511 equipped to the second planar mirror 507 for detecting the brightness of the UV rays, a curved mirror 508 for irradiating the UV ray to an alignment layer, and a third planar mirror 509.

When using the partially polarized UV rays, the polarizing system 505 may comprise a stack of quartz substrates such that a degree of polarization can be controlled according to the number of stacked quartz substrates. On the other hand, when using the linearly polarized UV, a linear polarizer may be used as the polarizing system 505.

Embodiment 2

FIGS. 7A to 7D are diagrams for explaining a process of forming an alignment layer for a liquid crystal display device in accordance with a second embodiment of the invention, in which the alignment layer is formed on a thin film transistor substrate of an IPS mode liquid crystal display device.

The second embodiment of the invention has the same construction as that of the first embodiment of the invention, except for the construction of layers formed on the substrate during a substrate preparation process, and regions which are shielded by the mask(s) during a UV irradiation process. The second embodiment will be described as follows.

Figure 7A:
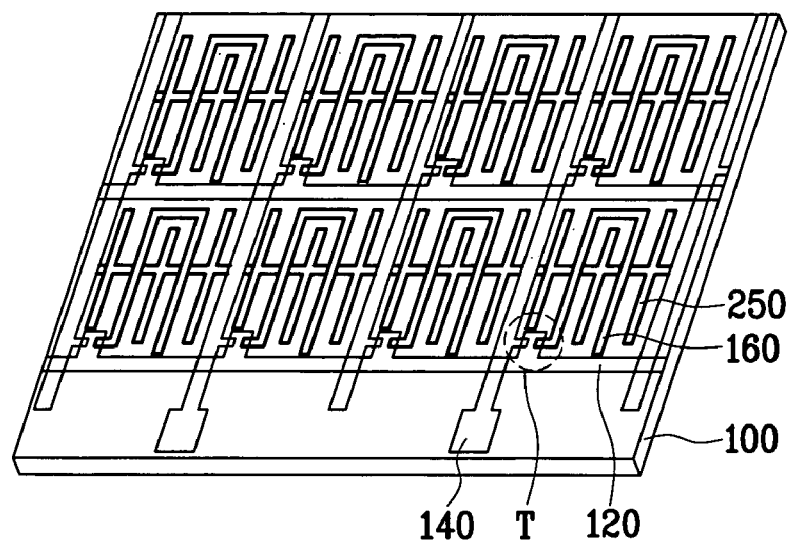
FIGS. 7A to 7D are diagrams for illustrating the steps for forming an alignment layer for a liquid crystal display device in accordance with a second embodiment of the present invention.

First, as shown in FIG. 7A, a substrate is prepared.

The substrate has a plurality of layers formed on a transparent substrate 100. The substrate 100 of the second embodiment has the same construction as that of the first embodiment in that a gate line 120, a data line 140, a thin film transistor T, and a pixel electrode 160 connected to a drain electrode of the thin film transistor T are formed on the transparent substrate 100. However, the substrate 100 of the second embodiment is different from that of the first embodiment in that it includes a common electrode 250 formed parallel to the pixel electrode.

Although the layers formed on the substrate 100 of FIG. 7A are not described in detail herein, these layers in FIG. 7A can be formed by various methods using various materials and are known in the art.

Figure 7B:
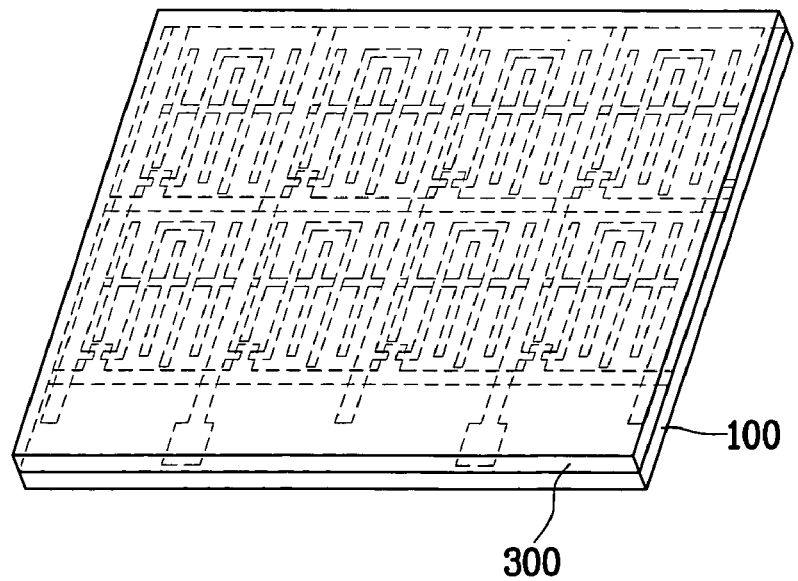

Then, as shown in FIG. 7B, an alignment material 300 is coated on the substrate.

A coating method and an alignment material are the same as those of the first embodiment.

Figure 7C:
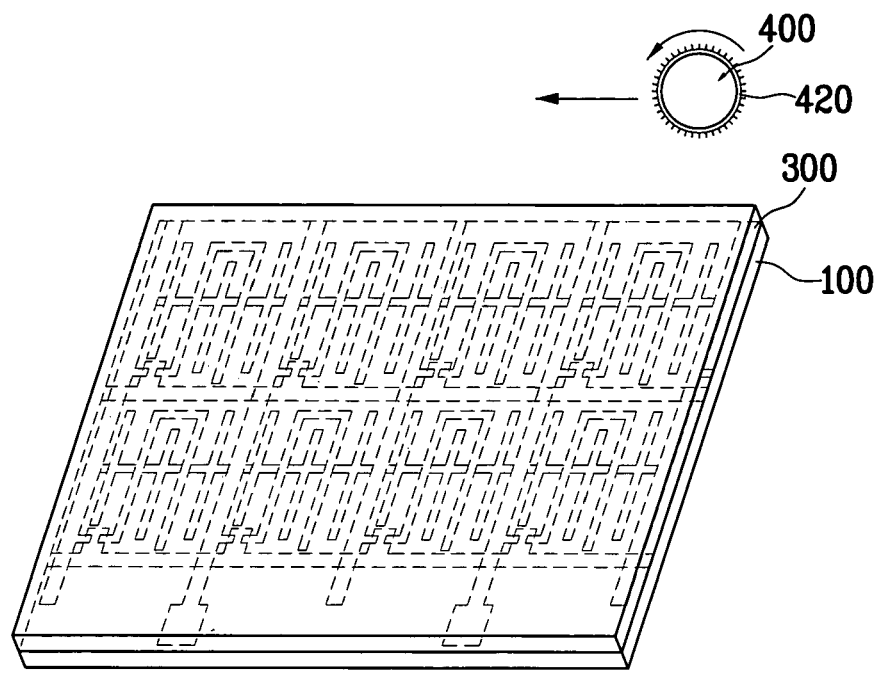

Then, as shown in FIG. 7C, rubbing is performed on the surface having the alignment material coated thereon. Rubbing is performed in a desired alignment direction using a rubbing roll 400 having rubbing fabrics 420 attached thereto, which is the same as the first embodiment.

Figure 7D:
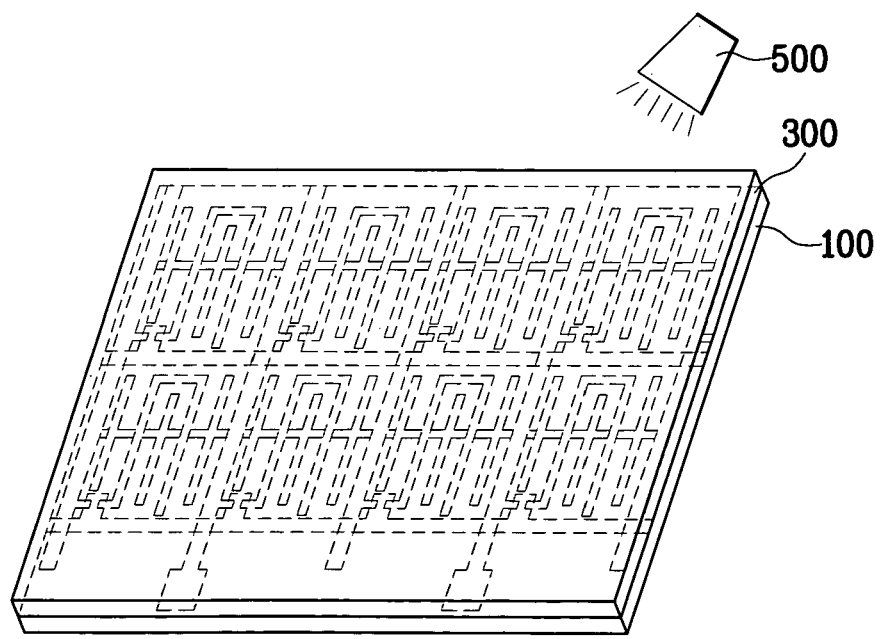

Then, as shown in FIG. 7D, polarized UV rays are irradiated onto the substrate that has completed the rubbing process using the UV irradiation apparatus 500.

Change in sequence between the UV irradiation process and the rubbing process, UV irradiation over the entire surface of the substrate, adjustment in the polarization direction of the UV rays, selection between partially polarized light and linearly polarized light, and the use of irradiation wavelength, irradiation energy, an irradiation method, and an irradiation apparatus for irradiating the polarized UV light are the same as those of the first embodiment.

According to the second embodiment, however, when irradiating UV rays only onto step regions, such step regions are different from those of the first embodiment. That is, the first embodiment is related to the thin film transistor substrate of the TN mode, in which the steps are formed at the gate line region, the data line region, and the thin film transistor region, whereas the second embodiment is related to the thin film transistor substrate of the IPS mode, in which the steps are formed at a region where the pixel electrode and the common electrode are formed as well as at the gate line region, the data line region, and the thin film transistor region. Accordingly, in the second embodiment, the UV irradiation process is performed on the step regions while shielding regions other than the gate line region, the data line region, the thin film transistor region, the pixel electrode region, and the common electrode region with one or more masks.

Embodiment 3

FIGS. 8A to 8D are diagrams for explaining a process of forming an alignment layer for a liquid crystal display device in accordance with a third embodiment of the invention, in which the alignment layer is formed on a color filter substrate of a TN mode or an IPS mode liquid crystal display device.

The third embodiment of the invention has the same construction as that of the first embodiment of the invention, except for a construction of layers formed on the substrate during a substrate preparation process, and a region which is shield by the mask(s) during a UV irradiation process.

Figure 8A:
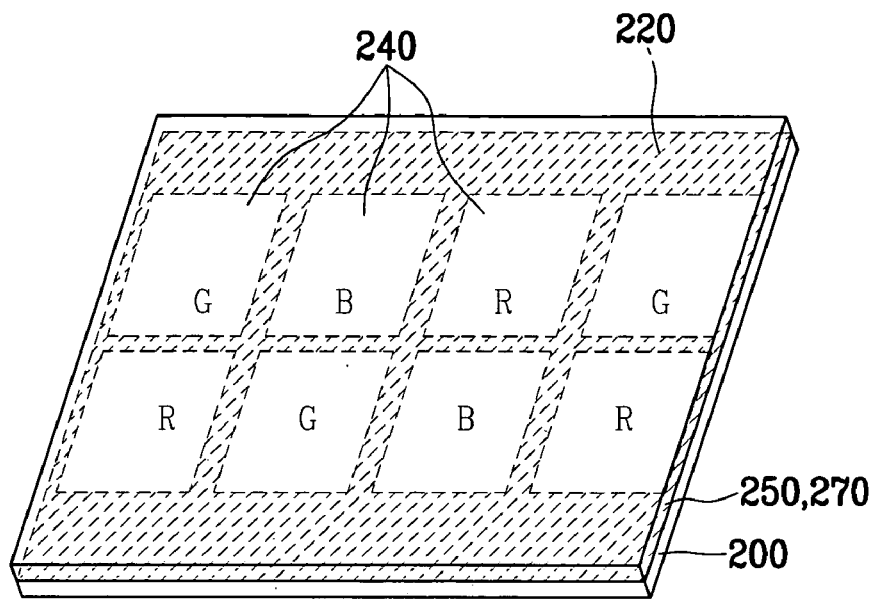
FIGS. 8A to 8D are diagrams for illustrating the steps for forming an alignment layer for a liquid crystal display device in accordance with a third embodiment of the present invention.

First, as shown in FIG. 8A, a substrate is prepared.

The substrate has a plurality of layers formed on a transparent substrate 200, in which the layers comprise a light shielding layer (black matrix) 220 formed on the transparent substrate for preventing leakage of light, and color filter layers 240 between portions of the light shielding layer 220 for red, green, and blue light.

In the case of TN mode, a common electrode 250 is formed on the light shielding layer 220 and the color filter layers 240, and in the case of IPS mode, an overcoat layer 270 is formed thereon.

Column spacers are additionally formed on the common electrode 250 or the overcoat layer 270 in order to maintain a cell gap in the liquid crystal display device.

Although the layers formed on the substrate are not described in detail herein, these layers in FIG. 8A can be formed by various methods using various materials and are known in the art.

Figure 8B:
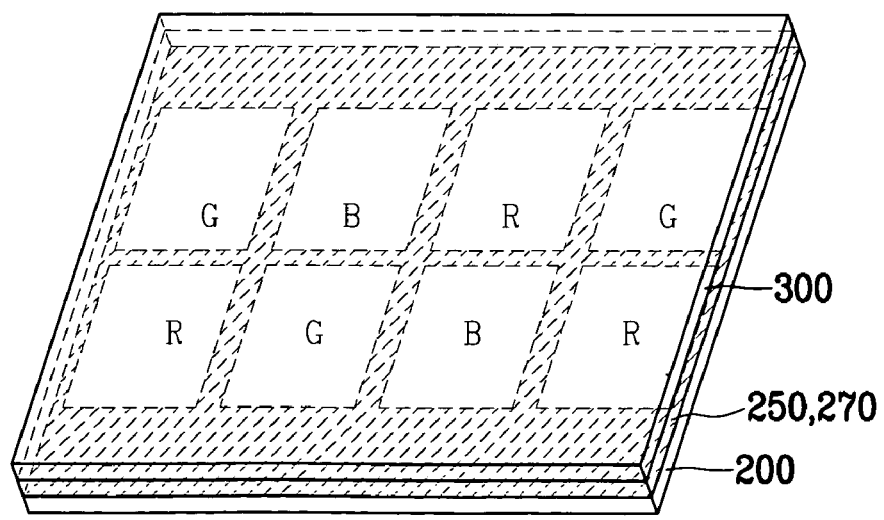

Then, as shown in FIG. 8B, an alignment material 300 is coated on the substrate.

A coating method and an alignment material are the same as those of the first embodiment and thus, the description thereof will be omitted.

Figure 8C:
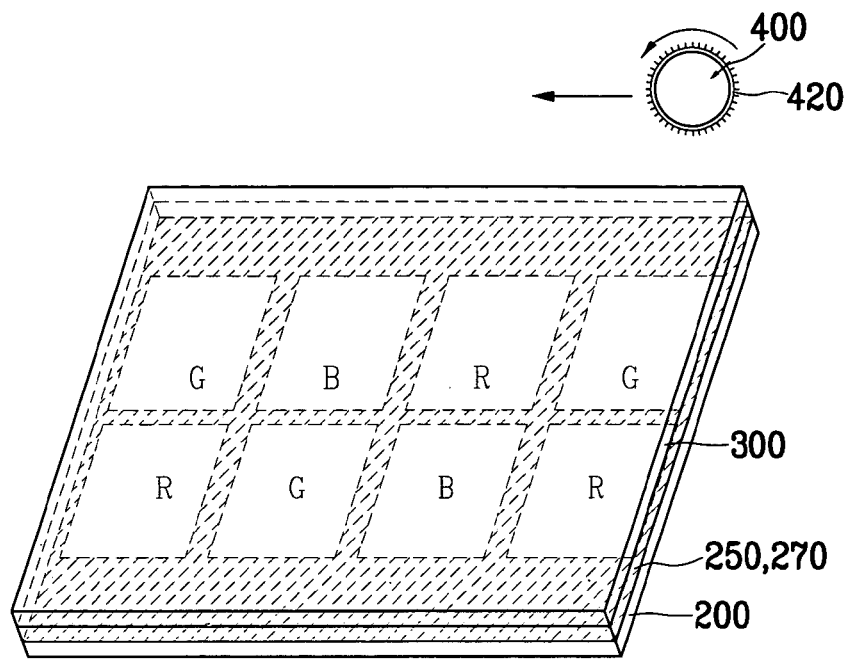

Then, as shown in FIG. 8C, a rubbing process is performed on the surface having the alignment material coated thereon. The rubbing process is performed in a desired alignment direction using a rubbing roll 400 having rubbing fabrics 420 attached thereto, which is the same as the first embodiment.

Figure 8D:
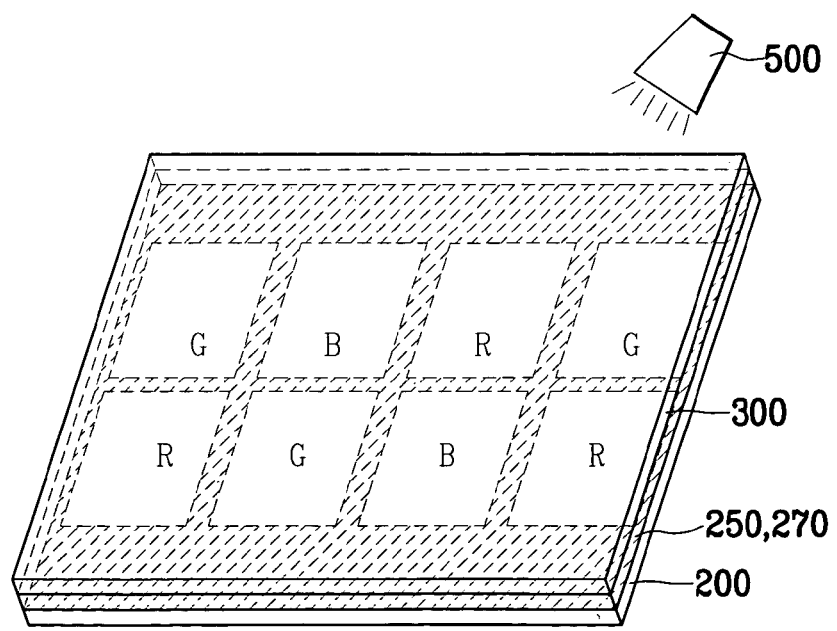

Then, as shown in FIG. 8D, polarized UV rays are irradiated onto the substrate 200 that has completed the rubbing process using the UV irradiation apparatus 500.

Change in sequence between the UV irradiation process and the rubbing process, UV irradiation over the entire surface of the substrate, adjustment in the polarization direction of the UV rays, selection between partially polarized light and linearly polarized light, and the use of irradiation wavelength, irradiation energy, an irradiation method, and an irradiation apparatus for irradiating the polarized UV light are the same as those of the first embodiment.

According to the third embodiment, however, when irradiating UV rays only onto step regions, such step regions are different from those of the first embodiment. That is, according to the third embodiment, the step regions are regions where the column spaces are formed, and thus the irradiation process is preferably performed while shielding regions other than column spacer regions with the mask(s).

Additionally, although not shown in the drawings, the method for forming the alignment layer according to the invention can also be applied to a color filter substrate and a thin film transistor substrate for other modes. At this time, when irradiating the polarized UV rays only onto the step regions, the polarized UV rays are irradiated while shielding with the mask(s) those regions other than the step regions according to the respective modes which will be known by those skilled in the art.

Embodiment 4

A fourth embodiment of the invention relates to a method for manufacturing a liquid crystal display device. The method of the fourth embodiment comprises the steps of: preparing a first substrate having thin film transistors formed thereon, and a second substrate having a color filter layer formed thereon; coating an alignment material on at least one of the substrates; rubbing the substrate having the alignment material coated thereon; irradiating polarized UV rays onto the substrate having the alignment material coated thereon; and combining both substrates. The rubbing is performing before the irradiating step, the rubbing is performed after the irradiating step, or the rubbing is performed simultaneously with the irradiating step.

The step of preparing the first substrate is preferably the same as the process of preparing the substrate in the first embodiment or in the second embodiment described above.

The step of preparing the second substrate is preferably the same as the process of preparing the substrate in the third embodiment described above.

Additionally, the step of coating the alignment material, the step of rubbing the alignment material, and the step of irradiating the UV rays are the same as the processes of the first embodiment described above.

The step of combining both substrates may be performed in a vacuum injection manner or a liquid crystal drop manner. The vacuum injection manner is a manner of injecting the liquid crystals by osmotic pressure after combining both substrates. The liquid crystal drop manner is a manner of combining both substrates after dropping the liquid crystals on one of both substrates. As the size of the substrate is increased, the liquid crystal drop manner is preferred since the vacuum injection manner requires an increased liquid injection time, resulting in reduction of productivity.

A light leakage phenomenon of liquid crystal display devices manufactured by the method according to the invention and of liquid crystal display devices manufactured by the conventional method will be described with reference to Inventive examples and Comparative example, respectively.

INVENTIVE EXAMPLES

The present inventors manufactured IPS mode liquid crystal display devices according to the fourth embodiment of the present invention.

A first substrate was prepared according to the substrate preparation process of the second embodiment, and a second substrate was prepared according to the substrate preparation process of the third embodiment. Coating of an alignment material was performed in such a manner of curing the alignment material after printing the alignment material. Polarized UV rays were irradiated after the rubbing process of the alignment material.

Degree of polarization, irradiation wavelength, and irradiation energy were changed as shown in Table 1.

TABLE 1

| | Degree of Polarization | Irradiation Wavelength (nm) | Irradiation Energy |
|---|---|---|---|
| Inventive example 1 | 0.55 | 250 | 0.05 |
| Inventive example 2 | 0.55 | 250 | 1 |
| Inventive example 3 | 0.55 | 250 | 2 |
| Inventive example 4 | 0.55 | 250 | 3 |
| Inventive example 5 | 0.55 | 365 | 0.2 |
| Inventive example 6 | 0.55 | 365 | 4.5 |
| Inventive example 7 | 0.55 | 365 | 9 |
| Inventive example 8 | 0.55 | 365 | 13.5 |

Then, after dropping liquid crystals on the first substrate, the first and the second substrates were combined to produce the IPS mode liquid crystal display devices.

Then, a light leakage phenomenon in the liquid crystal display devices of Inventive examples 1 to 8 according to the present invention was tested, and results thereof were obtained respectively as shown in FIGS. 9A to 9H.

COMPARATIVE EXAMPLE

An IPS mode liquid crystal display device was manufactured by the conventional method wherein the rubbing of the alignment layer was performed but the irradiation of polarized UV rays was not performed. Then, a light leakage phenomenon in the liquid crystal display device of Comparative example was tested, and results thereof were obtained as shown in FIG. 9I.

Figure 9A:
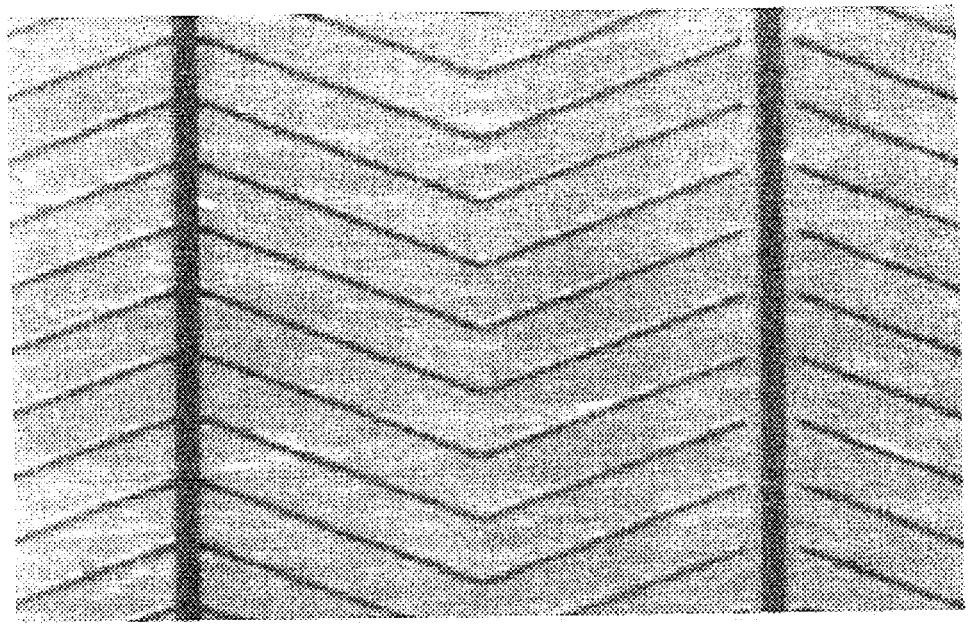
FIGS. 9A to 9I illustrate a light leakage phenomenon of liquid crystal display devices manufactured by the method of the present invention (FIGS. 9A-9H) and the related art method (FIG. 9I).
Figure 9B:
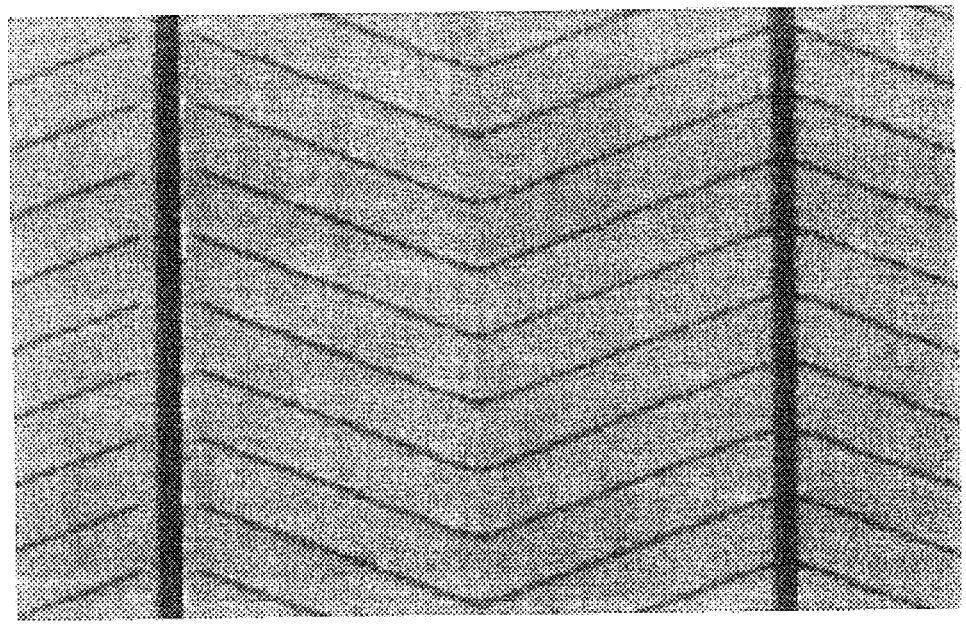
Figure 9C:
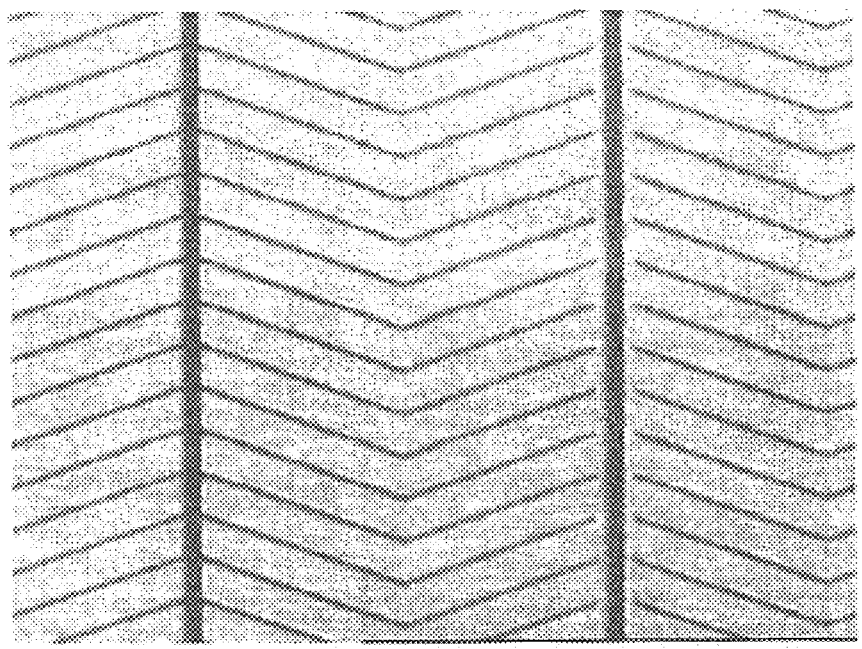
Figure 9D:
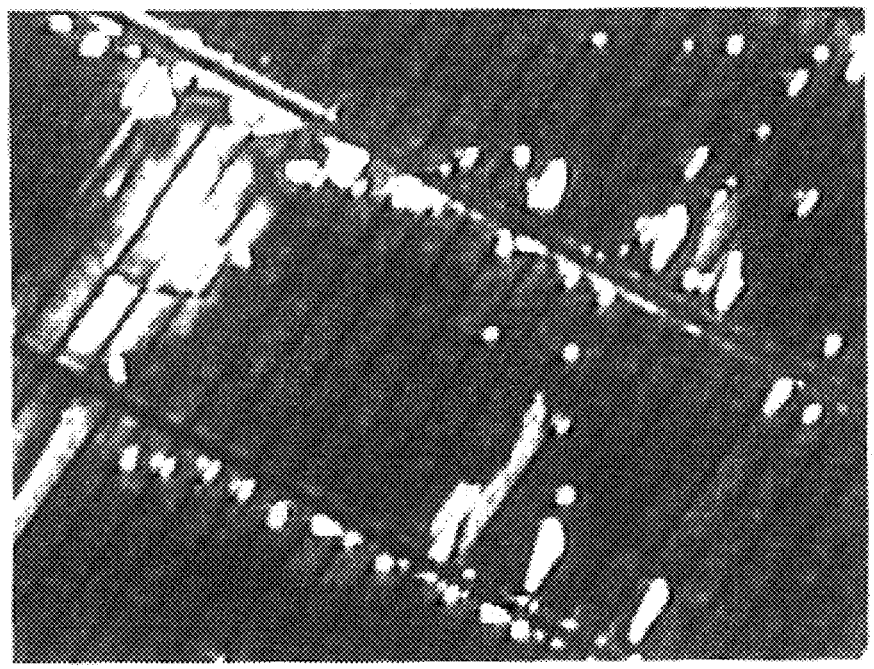
Figure 9E:
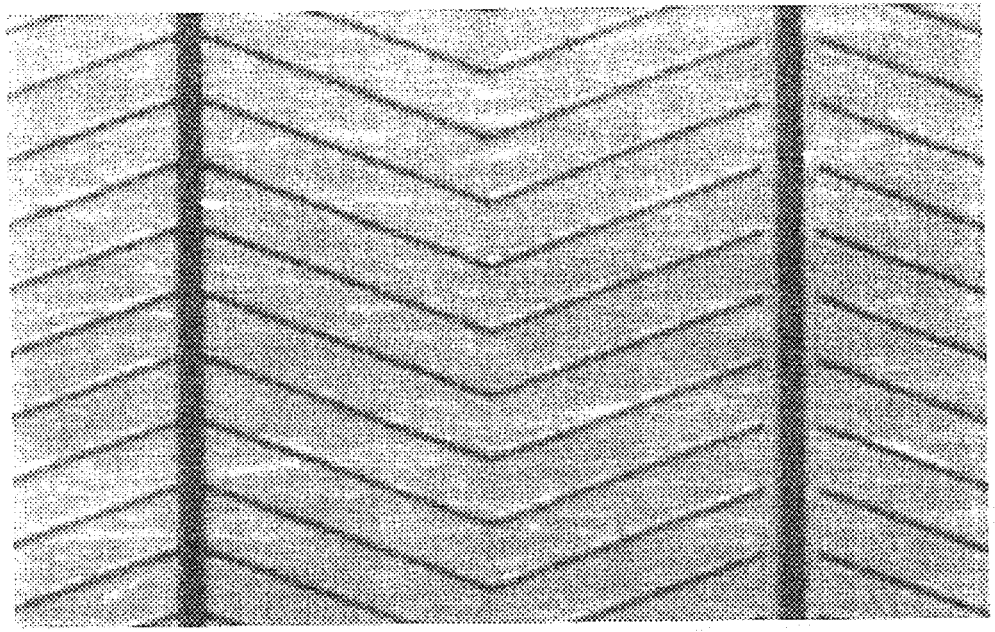
Figure 9F:
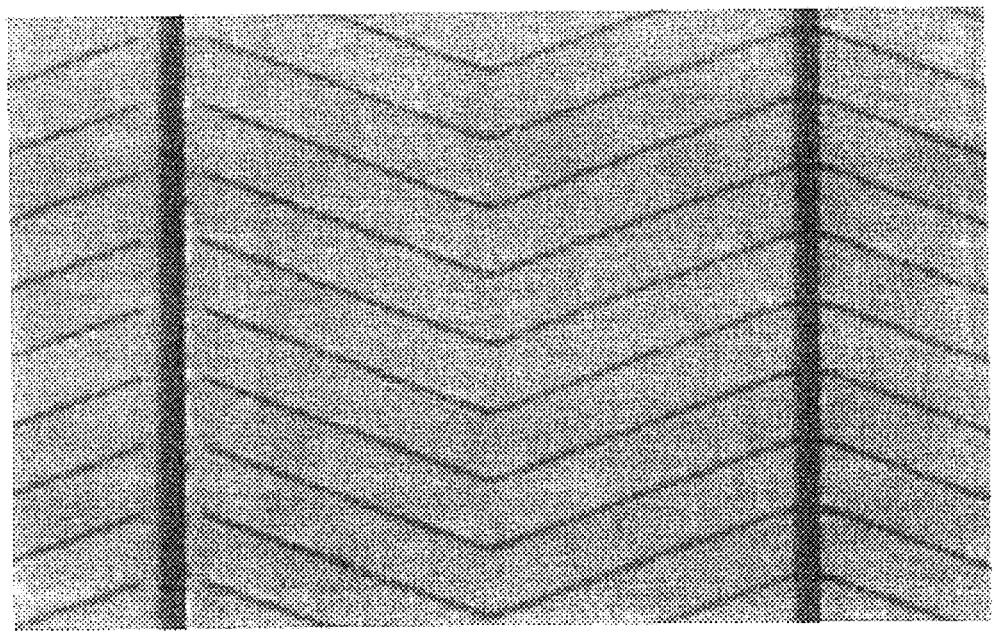
Figure 9G:
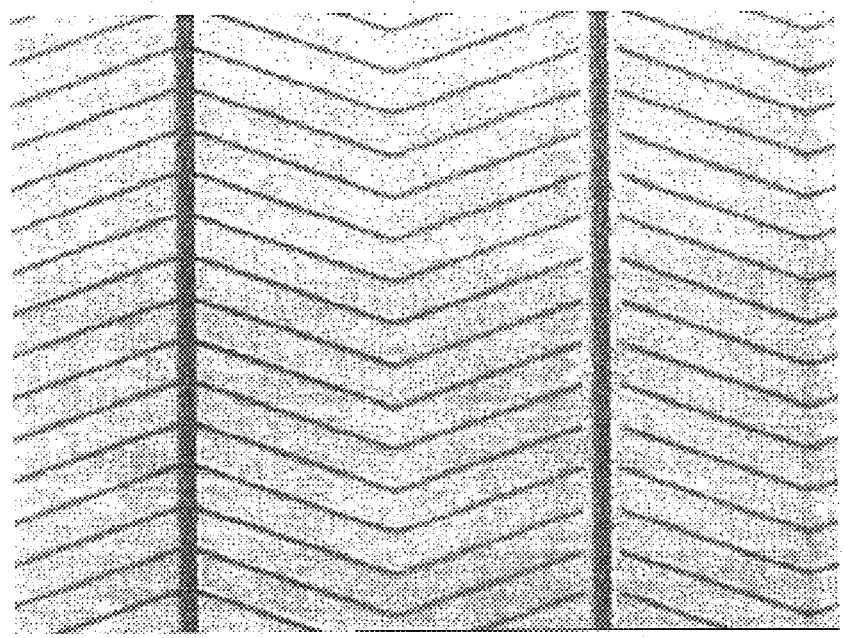
Figure 9H:
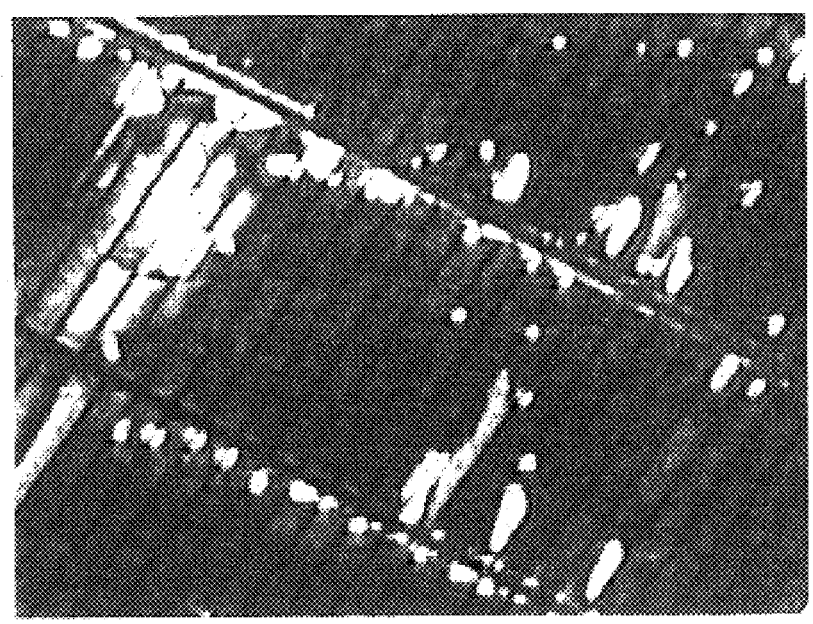
Figure 9I:
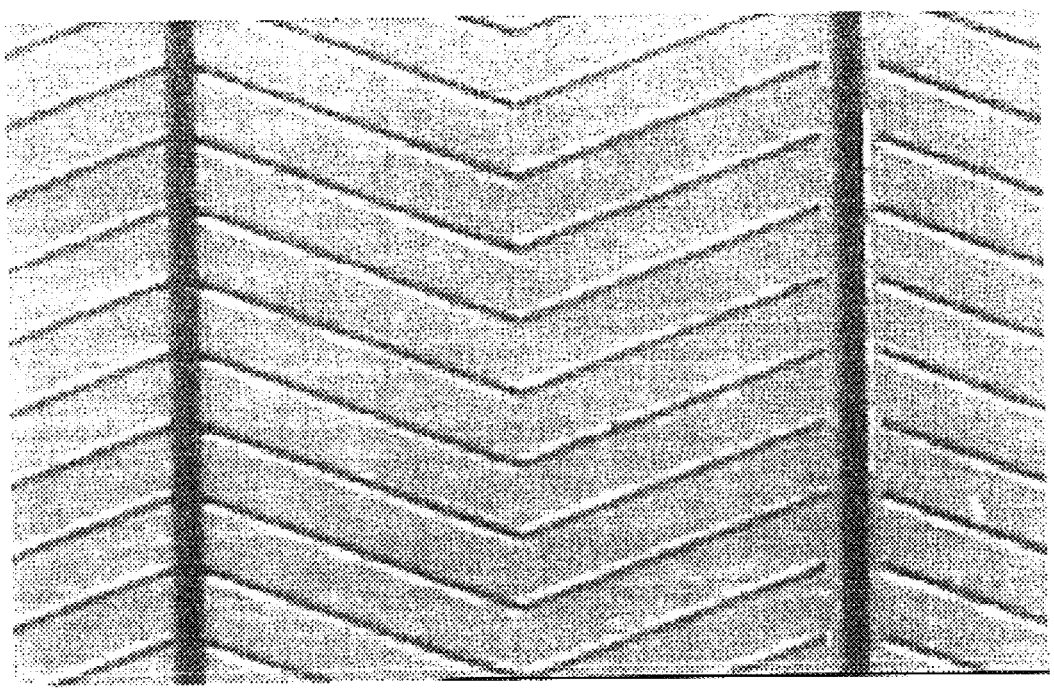

More specifically, FIGS. 9A to 9H correspond respectively to the liquid crystal display devices of Inventive examples 1 to 8 according to the present invention, whereas FIG. 9I corresponds to the liquid crystal display device of Comparative example according to the related art.

As shown in FIGS. 9A to 9I, it can be appreciated that leakage of light does not occur in FIGS. 9A to 9C (Inventive examples 1 to 3) and in FIGS. 9E to 9G (Inventive examples 5 to 7), whereas leakage of light occurs in FIG. 9D (Inventive example 4), in FIG. 9H (Inventive example 8) and in FIG. 9I (Comparative example).

As a result, it can be appreciated that, firstly, when the process of irradiating the polarized UV rays is performed together with the rubbing process (Inventive examples), the leakage of light does not occur in most cases in comparison to the case where only the rubbing process is performed (Comparative example). Secondly, when the polarized UV rays have an excessive irradiation energy during the process of irradiating the polarized UV rays, the alignment material may be damaged, thereby causing leakage of light (Inventive examples 4 and 8). As for a preferred irradiation energy according to the present invention, when the irradiation wavelength is 200 nm or more and less than 300 nm, the irradiation energy is preferably between 0.05 J and 2 J, and when the irradiation wavelength is 300 nm or more and 400 nm or less, the irradiation energy is preferably between 0.2 J and 9 J.

As apparent from the above description, the present invention has advantageous effects as follows.

Firstly, since the rubbing process is performed, thereby increasing anchoring energy, the liquid crystal display device of the invention does not suffer from image sticking.

Secondly, since the process of irradiating the polarized UV rays is performed, the liquid crystal display device of the invention does not suffer from the problem of light leakage generated when the arrangement of the rubbing fabrics is disordered or when the rubbing fabrics do not contact the substrate in the rubbing alignment method.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for forming an alignment layer for a liquid crystal display device, the method comprising:
    preparing a substrate;
    coating an alignment material on the substrate;
    rubbing the substrate having the alignment material coated thereon; and
    performing a photo-alignment by irradiating ultraviolet (UV) rays onto the substrate having the alignment material coated thereon,
    wherein the UV rays are irradiated over at least one area of the substrate having the alignment material coated thereon,
    wherein the at least one area is either an entire surface of the substrate having the alignment material coated thereon, or a step region on the substrate having the alignment material coated thereon in which case other regions are being shielded with at least one mask, and
    wherein the direction of rubbing and the polarized direction of the UV rays are vertical to each other when the photo-alignment is realized by a photo-decomposition reaction, or the direction of rubbing and the polarized direction of the UV rays are parallel to each other when the photo-alignment is realized by a photo-isomerization reaction or a photo-dimerization reaction.

2. The method according to claim 1, wherein the step of rubbing is performed before the step of irradiating the UV rays.

3. The method according to claim 1, wherein the step of irradiating the UV rays is performed before the step of rubbing.

4. The method according to claim 1, wherein the step of rubbing and the step of irradiating the UV rays are performed at the same time.

5. The method according to claim 1, wherein the step of preparing the substrate comprises:
    forming a gate line and a data line crossing each other on a transparent substrate to define a pixel region thereon;
    forming a thin film transistor on a crossing region of the gate line and the data line, the thin film transistor including a gate electrode, a source electrode and a drain electrode; and
    forming a pixel electrode connected to the drain electrode of the thin film transistor.

6. The method according to claim 5, wherein the step of irradiating the UV rays is performed while shielding regions other than a gate line region, a data line region and a thin film transistor region with at least one mask.

7. The method according to claim 1, wherein the step of preparing the substrate comprises:
    forming a gate line and a data line crossing each other on a transparent substrate to define a pixel region thereon;
    forming a thin film transistor on a crossing region of the gate line and the data line, the thin film transistor including a gate electrode, a source electrode and a drain electrode;
    forming a pixel electrode connected to the drain electrode of the thin film transistor; and
    forming a common electrode parallel to the pixel electrode.

8. The method according to claim 7, wherein the step of irradiating the UV rays is performed while shielding regions other than a gate line region, a data line region, a thin film transistor region, a pixel electrode region, and a common electrode region with at least one mask.

9. The method according to claim 1, wherein the step of preparing the substrate comprises:
    forming a light shielding layer on a transparent substrate;
    forming color filter layers on the light shielding layer;
    forming a common electrode on the color filter layers; and
    forming column spacers on the common electrode.

10. The method according to claim 9, wherein the step of irradiating the UV rays is performed while shielding regions other than column spacer regions with at least one mask.

11. The method according to claim 1, wherein the step of preparing the substrate comprises:
    forming a light shielding layer on a transparent substrate;
    forming color filter layers on the light shielding layer;
    forming an overcoat layer on the color filter layers; and
    forming column spacers on the overcoat layer.

12. The method according to claim 11, wherein the step of irradiating the UV rays is performed while shielding regions other than column spacer regions with at least one mask.

13. The method according to claim 1, wherein in the irradiating step, the UV rays are partially or linearly polarized.

14. The method according to claim 1, wherein in the irradiating step, the UV rays have an irradiation wavelength in the range of 200 nm to 400 nm.

15. The method according to claim 14, wherein the UV rays have an irradiation wavelength of 200 nm or more and less than 300 nm, and an irradiation energy in the range of 0.05 J to 2 J.

16. The method according to claim 14, wherein the UV rays have an irradiation wavelength of 300 nm or more and 400 nm or less, and an irradiation energy in the range of 0.2 J to 9 J.

17. The method according to claim 1, wherein in the irradiating step, the UV rays are polarized and are irradiated vertically or obliquely to the substrate.

18. The method according to claim 1, wherein the alignment material is a polymeric material selected from the group consisting of polyimide, polyamic acid, polyvinylcinnamate, polyazobenzene, polyethyleneimine, polyvinyl alcohol, polyamide, polyethylene, polystyrene, polyphenylenephthalamide, polyester, polyurethane, and polymethyl methacrylate.

19. The method according to claim 1, wherein an alignment direction of the alignment material produced by the rubbing step is identical to an alignment direction of the alignment material produced by the irradiating step.

20. A method for manufacturing a liquid crystal display device, the method comprising:
    preparing first and second substrates;
    coating an alignment material on at least one of the substrates;
    rubbing the substrate having the alignment material coated thereon;
    performing a photo-alignment by irradiating ultraviolet rays onto the substrate having the alignment material coated thereon; and
    combining both substrates,
    wherein the ultraviolet rays are irradiated over at least one area of the substrate having the alignment material coated thereon,
    wherein the at least one area is either an entire surface of the substrate having the alignment material coated thereon, or a step region on the substrate having the alignment material coated thereon in which case other regions are shielded with at least one mask, and
    wherein the direction of rubbing and the polarized direction of the UV rays are vertical to each other when the photo-alignment is realized by a photo-decomposition reaction, or the direction of rubbing and the polarized direction of the UV rays are parallel to each other when the photo-alignment is realized by a photo-isomerization reaction or a photo-dimerization reaction.

21. The method according to claim 20, further comprising:
    dropping liquid crystals onto one of the substrates before the combining step.

22. The method according to claim 20, wherein an alignment direction of the alignment material produced by the rubbing step is identical to an alignment direction of the alignment material produced by the irradiating step.

23. The method according to claim 20, wherein the rubbing step is performed before or after the irradiating step.

24. The method according to claim 20, wherein the rubbing step is performed at the same time as the irradiating step.

* * * * *